US011408749B2

(12) United States Patent
Schad, Jr.

(10) Patent No.: US 11,408,749 B2
(45) Date of Patent: Aug. 9, 2022

(54) PERSONAL NAVIGATION SYSTEM HAPTIC DEVICE

(71) Applicant: Stephen Wesley Schad, Jr., Center Harbor, NH (US)

(72) Inventor: Stephen Wesley Schad, Jr., Center Harbor, NH (US)

( * ) Notice: Subject to any disclaimer, the term of this patent is extended or adjusted under 35 U.S.C. 154(b) by 148 days.

(21) Appl. No.: 15/984,952

(22) Filed: May 21, 2018

(65) Prior Publication Data

US 2018/0348006 A1 Dec. 6, 2018

Related U.S. Application Data

(60) Provisional application No. 62/512,303, filed on May 30, 2017.

(51) Int. Cl.
*G01C 21/36* (2006.01)

(52) U.S. Cl.
CPC ..... *G01C 21/3652* (2013.01); *G01C 21/3605* (2013.01); *G01C 21/3655* (2013.01); *G01C 21/3661* (2013.01); *G01C 21/3679* (2013.01); *G01C 21/3688* (2013.01); *G01C 21/3697* (2013.01); *G01C 21/362* (2013.01); *G01C 21/3611* (2013.01); *G01C 21/3623* (2013.01)

(58) Field of Classification Search
CPC .. G01C 21/00; G01C 21/362; G01C 21/3623; G01C 21/3652; G01C 21/3688; G01C 21/3655; G01C 21/3605; G01C 21/3661; G01C 21/3679; G01C 21/3697; G01C 21/3611; H01F 7/0263
USPC ................................................. 701/400–541
See application file for complete search history.

(56) References Cited

U.S. PATENT DOCUMENTS

| 8,457,654 | B1 | 6/2013 | Roskind |
| 8,838,387 | B2 | 9/2014 | Larmo et al. |
| 9,092,954 | B2 | 7/2015 | Visitacion et al. |
| 9,140,555 | B1 | 9/2015 | Andersson et al. |
| 9,576,447 | B1 * | 2/2017 | Curry ................. G01C 21/3652 |

(Continued)

FOREIGN PATENT DOCUMENTS

| EP | 2717114 A1 * | 4/2014 | .......... H04M 1/0249 |
| WO | 2011066850 A1 | 6/2011 | |
| WO | 2015179211 A1 | 11/2015 | |

OTHER PUBLICATIONS

A. Komninos, M. Astrantzi, A. Plessas, V. Stefanis and J. Garofalakis, "Non-verbal audio and tactile mobile navigation," 2014 IEEE 10th International Conference on Wireless and Mobile Computing, Networking and Communications (WiMob), Larnaca, 2014, pp. 314-321, doi: 10.1109/WiMOB.2014.6962188. (Year: 2014).*

(Continued)

*Primary Examiner* — Jeffrey C Boomer
*Assistant Examiner* — Paul Allen
(74) *Attorney, Agent, or Firm* — Hamilton, Brook, Smith & Reynolds, P.C.

(57) ABSTRACT

A method and system for providing navigation commands allows users to navigate to a destination by way of haptic feedback. The method and system employ: (1) a processor executed software application, and (2) one or more vibrating nodes worn by a user. Upon providing a destination via an application, the application sends commands to the nodes to vibrate along a specific signature to indicate, through the sense of touch, navigation commands to the user.

19 Claims, 12 Drawing Sheets

(56) References Cited

U.S. PATENT DOCUMENTS

| | | | | |
|---|---|---|---|---|
| 2005/0132290 | A1* | 6/2005 | Buchner | G06F 3/011 |
| | | | | 715/702 |
| 2008/0051991 | A1* | 2/2008 | Lee | G01C 21/3623 |
| | | | | 701/533 |
| 2009/0216431 | A1* | 8/2009 | Vu | G01C 21/3655 |
| | | | | 701/533 |
| 2011/0126033 | A1* | 5/2011 | Springfield | G06F 1/3203 |
| | | | | 713/320 |
| 2012/0166077 | A1* | 6/2012 | Herzog | G01C 21/3652 |
| | | | | 701/425 |
| 2013/0218456 | A1* | 8/2013 | Zelek | G01C 21/3652 |
| | | | | 701/412 |
| 2014/0180582 | A1 | 6/2014 | Pontarelli et al. | |
| 2014/0228721 | A1* | 8/2014 | Ehrenreich | A61H 23/0245 |
| | | | | 601/47 |
| 2014/0358427 | A1* | 12/2014 | Fuhrman | G01C 21/3602 |
| | | | | 701/452 |
| 2015/0196101 | A1* | 7/2015 | Dayal | G06F 1/163 |
| | | | | 63/1.11 |
| 2015/0198454 | A1* | 7/2015 | Moore | H04N 13/204 |
| | | | | 701/428 |
| 2015/0198455 | A1* | 7/2015 | Chen | G01C 21/3629 |
| | | | | 701/428 |
| 2016/0124588 | A1* | 5/2016 | Cotier | G01C 21/3635 |
| | | | | 715/708 |
| 2016/0258758 | A1* | 9/2016 | Houston | G01C 21/20 |
| 2016/0265917 | A1* | 9/2016 | Yamamoto | A61H 3/06 |
| 2016/0273930 | A1* | 9/2016 | Wada | G01C 21/3438 |
| 2016/0370863 | A1* | 12/2016 | Jones | G06F 3/016 |
| 2017/0011602 | A1* | 1/2017 | Brav | G06K 9/00013 |
| 2017/0032787 | A1* | 2/2017 | Dayal | G01C 21/3602 |
| 2017/0038214 | A1* | 2/2017 | Benel | G01S 19/05 |
| 2017/0038792 | A1* | 2/2017 | Moore | G06F 1/1683 |
| 2017/0045368 | A1* | 2/2017 | Kim | G01C 21/362 |
| 2017/0142565 | A1* | 5/2017 | Dow | H04W 12/06 |
| 2017/0146358 | A1* | 5/2017 | Ward | G06F 3/016 |
| 2017/0254662 | A1* | 9/2017 | Takenaka | G01C 21/3652 |
| 2017/0372565 | A1* | 12/2017 | Do | G01C 21/265 |
| 2018/0068548 | A1* | 3/2018 | Hwang | G08B 21/18 |
| 2018/0195874 | A1* | 7/2018 | Andrew | G01C 21/3484 |
| 2018/0268670 | A1* | 9/2018 | Gabbay | A61F 9/08 |
| 2018/0283889 | A1* | 10/2018 | Koo | G01C 21/3484 |
| 2018/0321056 | A1* | 11/2018 | Yoo | G06F 3/016 |
| 2019/0234740 | A1* | 8/2019 | Gabbay | G01C 21/3652 |

OTHER PUBLICATIONS

Chiuariu, A, et al., "App Uses Haptic Feedback to Create a Virtual Cane for the Blind," Concept And Designs, Jan. 10, 2014.

Ertan, et al., "A Wearable Haptic Navigation Guidance System," The Media Laboratory, MIT, IEEE, p. 164-165, 1998.

"Can QR codes be used for navigation? Is there a way to infer positional information from a scanned QR code?", QR Codes, Apr. 25, 2012.

Moss, R., "Haptic technology: The next frontier in video games, wearables, virtual reality, and mobile electronics," VR Feature, Jan. 10, 2015.

Introducing Navigate Paris, The Elegant, Location-Enabled Jacket That Will Lead You Through The Streets of Paris,"Navigate—We:eX Wearable Experiments," Wearable Exp, Inc., Jul. 20, 2016.

Jeffrey, C., "Shape-shifting navigation device points you in the right direction," Electronics, Aug. 31, 2015.

* cited by examiner

701
Detached Node

PERSONAL NAVIGATION SYSTEM HAPTIC DEVICE

RELATED APPLICATION

This application claims the benefit of U.S. Provisional Application No. 62/512,303, filed on May 30, 2017. The entire teachings of the above application are incorporated herein by reference.

BACKGROUND

Personal navigation technology has improved greatly in the past two decades. The mass adoption of global positioning system (GPS) based navigation systems and more recently the mass adoption of smartphones and the navigation applications they contain, have allowed users to navigate to their destinations with ease and impressive accuracy. These navigation systems largely depend on visual display and/or audible output. In some circumstances, the visual and/or audible output can pose a safety risk where the user's eyes and ears should be focused on the road and his surroundings.

SUMMARY OF THE INVENTION

Embodiments of the present invention address the foregoing disadvantages and provide improved personal navigation systems and methods as follows.

Along with the mass adoption of GPS navigation systems and smartphones, more recently, there has been a rise in the use of wearable technology, or wearables, such as those used for fitness and health tracking. The Fitbit® for instance, is carried on the person and monitors user activity, such as steps taken or sleep patterns. Embodiments of the present invention invention leverage the trend in increased utilization of wearables to provide improved systems and methods for navigation through the use of haptic devices. For instance, in one such embodiment, a phone based application and vibratory nodes are employed by a user to navigate without relying upon visible cues and instead, the user relies on the sense of touch and haptic signatures provided by the vibratory nodes to prompt her on the next turn or action. The user's eyes and ears are left available for uninterrupted focusing on her path and surroundings.

One such example embodiment of the present invention is directed to a method of providing navigation commands to a user that begins by obtaining a destination and a starting point from the user. Next, such a method embodiment determines a plurality of turn by turn commands (logic) for navigating from the starting point to the destination. To continue, each of the plurality of turn by turn commands is converted into a respective haptic signature and the haptic signatures are forwarded to one or more vibratory nodes which are proximal to the user. In such an embodiment, the vibratory nodes are configured to indicate, through the sense of touch, the plurality of turn by turn commands to the user by performing each respective haptic signature. According to an embodiment, each respective haptic signature comprises one or more pulses with a unique combination of pulse amplitude, pulse width, duty cycle, and total run time.

Another embodiment of the method determines timing for forwarding each respective haptic signature where the determined timing causes each respective haptic signature to be forwarded to the one or more vibratory nodes when appropriate for the user to perform each corresponding turn by turn command. According to one such embodiment, the timing is determined based upon at least one of: execution time of performing a haptic signature to be forwarded, distance to an upcoming turn in the user's path of travel, and a speed at which the user is travelling.

As described herein, a method according to an embodiment of the invention obtains indications of a destination and a starting point from a user. In an example embodiment, at least one of the destination and starting point is obtained in response to the user scanning a quick response (QR) code. According to another embodiment, the destination is selected by the user from a database of locations. In one such embodiment of the present invention, one or more locations stored in the database are added by users of a social network.

Embodiments of the method may also provide functionality to facilitate plural users following one another. One such example embodiment includes receiving a request by a second user to follow a first user and upon approval by the first user, determining a plurality of following commands to facilitate the second user following the first user. In such an embodiment, each of the plurality of the following commands are converted into a respective haptic signature and forwarded to one or more vibratory nodes associated with the second user where the one or more vibratory nodes associated with the second user are configured to indicate the plurality of following commands to the second user.

In yet another embodiment of the method, the destination dynamically changes based upon the location of a second user and determining the turn by turn commands and converting of the turn by turn commands is repeated as the destination changes. In yet another embodiment, data regarding a number of vibratory nodes associated with the user is obtained and in such an embodiment, converting each of the plurality of turn by turn commands into a respective haptic signature considers whether the number of vibratory nodes associated with the user is odd or even.

According to an embodiment, the vibratory nodes are contained in a neck-worn housing. Likewise, in such an embodiment, the neck-worn housing may be configurable to enable positioning of the vibratory nodes contained therein to be in contact with skin above the user's clavicle. Further, in another embodiment, the vibratory nodes are magnetically contained in a housing.

In an alternative embodiment of the method, the destination is a tour comprising a plurality of destinations or points of interest. One such example embodiment may further include enabling the user to create the tour by indicating two or more destinations (points of interest). According to yet another example embodiment, a destination comprises at least one of: a latitude coordinate, a longitude coordinate, a title, a type, and a unique identifier. In another embodiment of the method, battery level information is received from the one or more vibratory nodes, and in such an embodiment, the forwarding of haptic signature patterns (representing turn by turn navigational commands) may be ceased when the battery level information is below a threshold.

Another embodiment of the present invention is directed to a system for providing navigation commands to a user. An example embodiment of the system comprises one or more vibratory nodes and a processor and a memory with computer code instructions stored thereon and communicatively coupled to the nodes. In such an embodiment, the processor and the memory, with the computer code instructions, are configured to cause the system to obtain a destination and a starting point from a user, determine a plurality of turn by turn commands for navigating from the starting point to the destination, convert each of the plurality of turn by turn commands into a respective haptic signature, and forward each respective signature to one or more vibratory nodes proximal to the user where the one or more vibratory nodes are configured to indicate the plurality of turn by turn commands to the user by performing each respective haptic signature.

Through the vibratory nodes, processor, memory, and computer code instructions, embodiments of the system may be configured to perform or embody any one or combination of the methods described herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the present invention follows.

Figure 1:
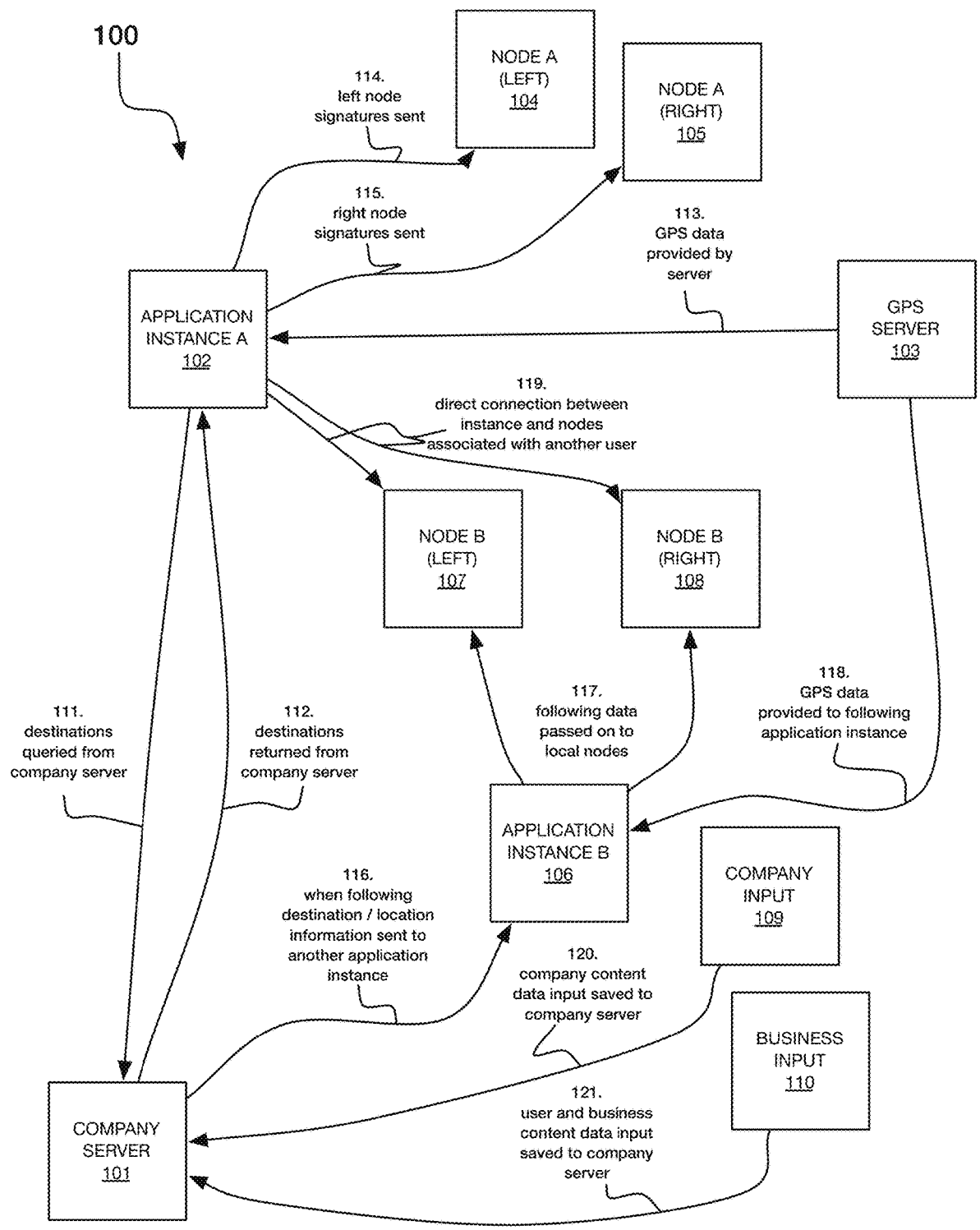
FIG. 1 is a block diagram of a system for providing navigation commands according to an embodiment.

FIG. 1 illustrates a system 100 that may be employed to provide navigation commands according to an embodiment. In the system 100, navigation commands 114, 115, 117, and 119 are provided to vibratory nodes 104, 105, 107, and 108 via the applications 102 and 106. The applications 102 and 106 communicate with the host server 101 to exchange destination data 111, 112, and 116. In the system 100, the company server 101 may also receive and store company content 120, from the company input device 109, and business data 121, from the business input device 110. Further still, the applications 102 and 106 communicate with the GPS server 103 to obtain GPS data 113 and 118. The applications 102 and 106 operate in conjunction with the company/host server 101 and GPS server 103 to provide the navigation commands 114, 115, 117, 119 at vibratory nodes 104, 105, 107, and 108 according to the embodiments of the present invention described herein, e.g., the method 1000. The host server 101 may include data 120 from the company 109 and data 121 from businesses 110, e.g., third party businesses that wish to advertise their presence to users of the host server 101. This data 120 and 121 may include point of interest information such as latitude and longitude coordinates, descriptions, and rich media such as images and videos.

Figure 3:
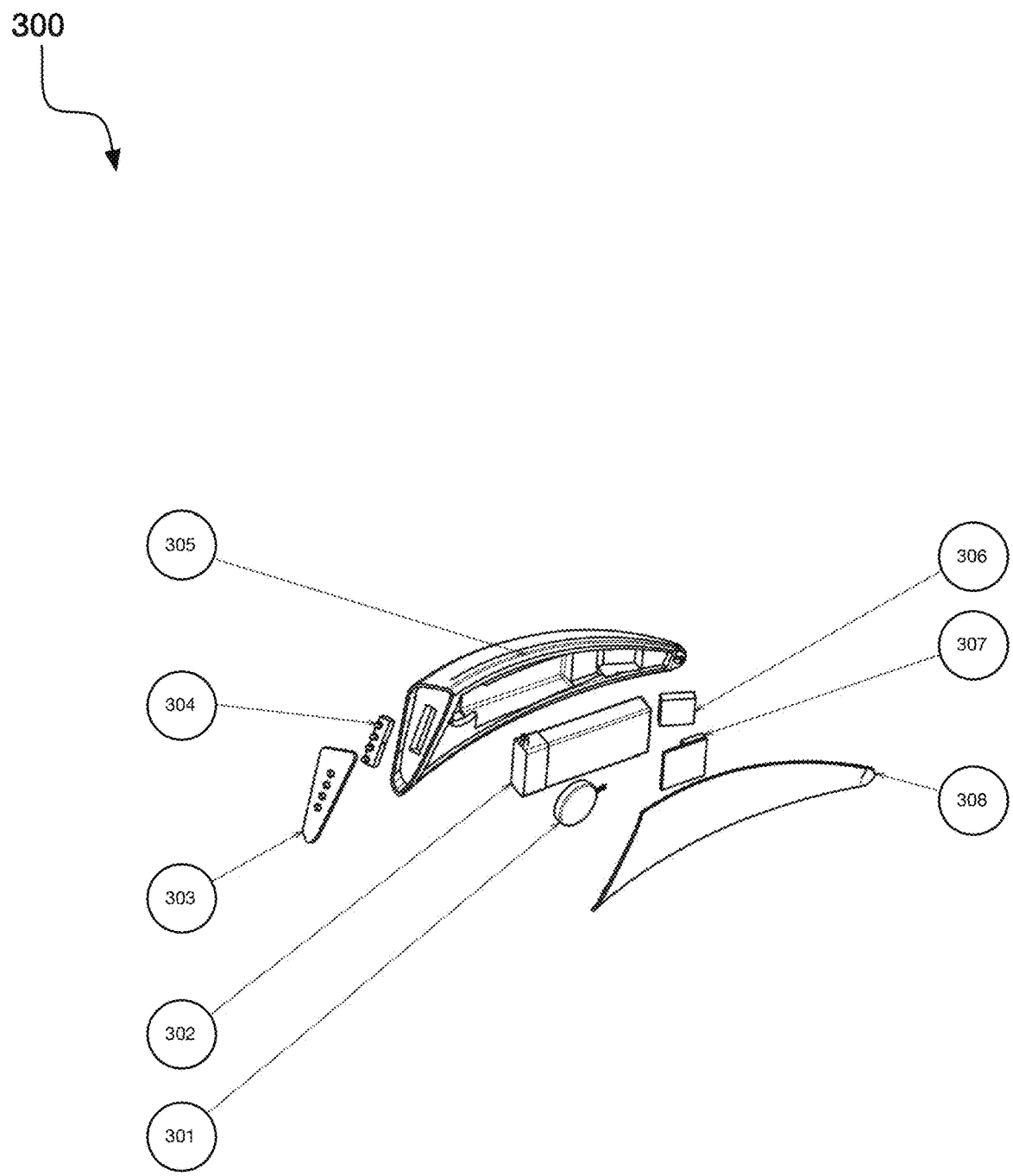
FIG. 3 is an exploded view of a vibratory node that may be utilized in embodiments.

In the system 100, the company server 101, GPS server 103, company input device 109, and business input device 110 may be implemented via any computing device or combination of computing devices as is known in the art. Further, while depicted separately, the company server 101, GPS server 103, company input device 109, and business input device 110 may be implemented on one or more computing devices and utilize any combination of local or remote storage devices to facilitate performing their operations described herein. The various elements of the system 100, e.g., the host server 101, GPS server 103, company input device 109, business input device 110, applications 102, 106, and vibratory nodes 104, 105, 107, and 108 may communicate via any means and methods known in the art. Moreover, the nodes 104, 105, 107, and 108 may embody any such nodes described herein, e.g., the node 300 (FIG. 3). Further, the application instances 102 and 106 may be executed on any computing device, e.g., a mobile device that can be communicatively coupled to the nodes 104, 105, 107, and 108.

In an example implementation of the system 100, a first user (not shown) indicates a destination via the application 102. This destination indication may be the result of input by the user, or may be facilitated with search functionality via the application 102 where destinations are queried 111 from the company server 101 and one or more destinations are returned 112 and selected. In response to the first user indicating the destination, the application 102 receives GPS data 113 from the GPS server 103. This GPS data 113 may include any GPS data known in the art, such as a current geographical location of a device associated with the application instance 102 and the turn by turn commands needed to navigate from a starting point to the subject destination. To continue, the application 102 converts the GPS data 113 (which may include turn by turn navigational commands) into haptic signatures and these haptic signatures 114 and 115 are sent to the vibratory nodes 104 and 105 worn by the first user. Further, in the embodiment of the system 100, a second user associated with the vibratory nodes 107 and 108 has configured, via the application 106, to be in a follow mode with respect to the user associated with the nodes 104 and 105 (i.e., the first user). This follow mode may be facilitated via the server 101, application 102 and/or GPS server 103. When implemented via the application 102, the application 102 sends the turn by turn navigational commands 119 directly to the nodes 107 and 108 worn by the second user. Likewise, when following is performed via the company server 101, the company server 101 can send data 116 to implement following. The following data 116 may include turn by turn navigational commands, haptic signatures, and/or location information so that corresponding or representative haptic signatures 117 can be sent to the nodes 107 and 108. In an embodiment where the following data 116 includes location data, e.g. a destination, the application instance 106 can communicate with the GPS server 103 to receive the necessary turn by turn commands 118 which the application 106 converts to the haptic signatures 117.

As described herein, embodiments of the present invention utilize haptic signatures, i.e., indications that can be sensed through touch, to provide navigation commands. While conventional navigation methods are limited to onscreen visual updates and voice commands (enunciated directions), embodiments of the present invention improve upon these existing methods by providing haptic feedback to the user by way of vibratory nodes, e.g., 104, 105, 107, or 108, connected to an application, e.g., 102 or 106. By transmitting the directional information as haptic commands multiple benefits are achieved.

Utilizing haptic commands greatly improves a user's attention and awareness while navigating. A user's attention is directed towards the onscreen display of the navigation device when using conventional navigation systems. Reliance on a display diverts the user's attention away from her environment. This is potentially dangerous, for example, when travelling at high speeds. A user's attention is directed at her environment when using haptic navigation which allows her to take in the sights and sounds more easily, including any potential hazards or dangers. Likewise, there is a lower cognitive load for the user when employing haptic navigation.

Embodiments of the present invention also provide improved security as compared to existing navigation modalities. For instance, in areas of high crime, holding a conventional navigation device may advertise to potential criminals that the user is likely not a local and possibly more likely to be carrying valuable items, including the navigation device itself. Embodiments of the present invention allow the user to initialize device operation at a safe location, for instance in a hotel lobby, by inputting an indication of a desired destination, and then store the device in a safe location, out of sight, while traveling to the desired destination. Likewise, the wearable vibratory nodes, e.g., 104, 105, 107, and 108 can be hidden away from prying eyes but remain effective for the user. In some embodiments, the vibratory nodes are worn discretely and are hardly noticeable (as a navigation device) to third parties but are in contact with sufficiently sensitive part(s) of the wearer's body.

Further, embodiments have improved accessibility for users with impairments or disabilities. Conventional navigation devices do not aid users with visual impairments as these conventional systems rely almost exclusively on visual displays of information. However, embodiments of the present invention allow a visually impaired user to navigate via haptic feedback. Likewise, in an embodiment, a user may indicate his destination and any other instructions via voice command so as to eliminate any need to utilize a visual display.

Embodiments of the present invention also connect users with rich content in addition to providing navigation commands. Embodiments of the present invention allow the user to navigate more freely and easily than conventional systems allow and further, embodiments of the present invention provide more than just an evolution on how to navigate, but also improve upon where to navigate. For instance, an application used to facilitate navigation, e.g., the application 102, can provide a rich source of predefined destinations for the user to explore. A user can search for a new location by entering an address and receiving data from the GPS server 103, or the user can search and scan for existing destinations stored on the company server 101. Thus, embodiments provide both a unique method of providing (generating and delivering) navigation commands and also improved functionality for determining navigation destinations.

Conventional navigation offers a limited number of destinations which are typically predefined by the manufacturer of the navigation device. Likewise, these destinations are typically only infrequently updated and access to these updates often requires additional payment. Embodiments of the present invention provide a growing database, such as the company server 101, of destinations which can also contain rich content such as photographs and videos. Further, the database can also be updated more frequently by the company and the users of the database. For example, in the system 100, the server 101 can be updated, via the company input device 109, with the data 120 determined by the server host itself, where the data 120 includes destination information and data.

Similarly, businesses struggle to add new locations to the databases upon which conventional navigation systems rely. Existing systems often require manufacturer pre-approval and a lengthy wait period before the new locations are included in a future software update. Embodiments of the present invention allow business locations to be easily added to the system 100, with no pre-approval required. Updates to the database 101 occur immediately and locations can be regulated through any combination of a system administrator and users of the system. To illustrate, in the system 100, a third party business may provide data 121 which includes a new business location and detailed information, e.g., hours, to the company server 101 via the business input device 110. This data 121 can then be found by users querying the server 101 to facilitate navigating to the business.

Additional benefits also facilitated by embodiments of the present invention include QR code scanning whereby users can scan QR codes and retrieve additional information about a destination. Another feature of embodiments enables the following of other users. That is, users can follow other users or be followed themselves upon mutual approval. Another advantageous feature in embodiments is referred to as "journey creation" where users can string multiple destinations together and tour around multiple destinations.

According to an embodiment, destination data may include generic bundles of information about a location. For instance, system data of a subject destination may comprise any combination of a latitude coordinate, a longitude coordinate, a title, a type, and a unique identifier. In practice, destination data can contain additional information, such as a written address, a description, and any media associated with the destination. An example of a destination would be a church located in the city center.

Embodiments may also facilitate providing navigation commands for "journeys," which are created by combining the data of at least two destinations. A journey can be considered an array of destinations and may also be associated with metadata indicating that the destinations together form a journey. Journeys may include respective data of at least two destinations (e.g., the unique identifiers associated with those destinations), a title, and a unique identifier. In practice, according to an embodiment, journey data contains additional information such as a description and additional media. An example of a journey might be the "Tour de Paris," in which the Notre Dame, the Louvre, and the Eiffel Tower, all each themselves destinations, are members of the journey. Destinations can be associated with one or multiple journeys, or none at all. By keeping the association of information fluid in this way, journeys can be easily created and updated.

In an example embodiment, destination data and journey data can be stored on one or more server, such as the server 101, that is used to facilitate providing navigation commands. Thus, embodiments can make the destination data and journey data available to all users in a variety of ways. A user may search directly for a destination, scan a QR code (discussed below) to bring up information about a destination, or simply be travelling within a certain proximity of a destination. Another useful way of finding a destination is by way of discovery facilitated through use of the application 102, 106. For example, in an embodiment, finding destinations may include pushing destination options to the user or querying the application 102, 106 for suggestions. In an embodiment, destinations that can be accessed result from a combination of destination data added to the server by users and pre-loaded destination data added to the server by an administrator.

Often, users of embodiments of the present invention will navigate to destinations indicated by the users themselves. However, under some circumstances, for instance when touring around a new city, a user might wish to explore places of interest, without knowing what those places of interest are. Instances of the application 102, 106 allow for this by way of a discovery functionality. According to an embodiment, a graphical user interface provided by the application 102, 106 includes a discovery section that lists destinations and journeys that the user might be interested in. To aid in this, the application 102, 106 automatically suggests interesting destinations located nearby (within a specified distance of the user's last known or current coordinates). In addition, the discovery section of the application 102, 106 can be populated with destinations and journeys that are relevant, for instance "Autumn Getaways" or "City Breaks." These listed destinations may be identified through examining data of where other users have gone or through know-how of administrators of the system 100. The administrator of the system has the ability to push information to the users on an ad hoc basis. In an embodiment, the data may be pushed to the applications 102, 106 automatically based upon rules determined by a system administrator or automatically, via data analysis. For example, data related to a given user may be automatically processed through a combination of machine learning and data mining to identify user patterns and habits. These habits and patterns can then be used to push data to the applications 102, 106. To illustrate, in an example embodiment, it is determined through data mining that a given user seeks out a particular type of restaurant when in a new location. Such a pattern may be automatically identified and then location data for that type of restaurant may be pushed to an application 102, 106 when the user goes to a new location.

As described herein, embodiments can utilize QR codes to facilitate a variety of functions, including following, discovery, and obtaining data regarding destinations and starting points. QR codes are a common way to transfer information from an analog source, for instance a poster, into a digital format, by way of a QR scanner. The data from the QR code can then be processed by software, similar to the way barcodes are processed in commercial retail.

In an embodiment, an application, such as the application 102, includes a built-in QR scanner which can be used by the user to access information, such as information about a destination or a journey. In such an embodiment, scanning a QR code reveals a unique identifier to the application 102 which can then be used to determine additional information about the journey or destination, for instance, through communication with the server (101). This may be done automatically with no further input from the user required. Once the additional information is received, the user is presented with the option of navigating to that destination or beginning the journey. The whole process of scanning to navigating typically only takes a couple of seconds—in contrast to entering an address manually—and is therefore, one of the quickest ways for a user to begin navigating. Further, in an alternative embodiment, the QR code may contain all of the necessary information needed. For example, the QR code may contain the coordinates of the destination, navigation commands, etc. and upon scanning the QR code, navigation to the destination can begin as described herein.

Embodiments of the present invention may further include generating QR codes themselves so as to facilitate the sharing of data, e.g., destinations and journeys. In an example embodiment, the application 102, 106 generates the QR codes associated with a specific destination or journey. Generating a QR code may be done upon user command and direction. For instance, when a user wants to share information about a destination with the public, she creates that destination data (including informative texts and any media associated with the destination) and the application automatically generates a QR code for the user to share on analog media, such as a poster or a flyer.

The combination of being able to create and scan QR codes is useful for all types of users, but particularly for users wishing to advertise their business. For instance, if a restauranteur wishes to advertise her restaurant, she can do so easily through the use of QR codes. The QR code is unique to her restaurant and she is free to publish the QR code in whatever way she deems to be most beneficial. In addition, as described herein, data of newly created destinations can be stored in a database, e.g., the server 101, allowing other users to search for the destination. Similarly, should another user be travelling within a certain distance of her restaurant, this other user will also be notified of the restaurant's existence (and where it is relative to his current location). In this way, embodiments of the present invention use QR code creation and scanning as a powerful means to connect users with local businesses.

Embodiments of the present invention can also connect with social networks to facilitate social networking. For example, users can share destinations, journeys, and location data on social networks, such as Facebook, Twitter, and Instagram. The benefit of this functionality is threefold: (1) it creates greater exposure for businesses associated with a destination, (2) there is a social benefit that results from sharing, and (3) it promotes uses of the functionality described herein to other users, which can create a more powerful and populated database of destinations and journeys. In addition to sharing on social networks, users can share data, e.g., a destination, via other communication means such as text message and email.

Similarly to sharing data, such as destination information on a social network, embodiments of the present invention also include functionality to share destination information to facilitate users following one another. Through a software application (e.g., 106) implementing an embodiment, a user can share his current location and receive location information of one or more other users (e.g. application instance 102 of the other user), where permission is given by that user. This effectively allows users to follow one another. By initiating following a user is creating a short-term destination, i.e., the other user, the coordinates of which are updated as the other user changes her location.

Embodiments provide multiple following styles. In one instance, an embodiment includes current location sharing, whereby, based upon a user's approval, that user's current location is made available to other approved (qualifying) users. This may be implemented by updating the sharing user's location only once on a database, e.g. 101, that can be accessed by the approved (qualifying) users. Further, in such an embodiment, the sharing user can cancel or exit operation of the following mode at any time.

Another embodiment provides ongoing following. In such an embodiment, the sharing user shares her current location indefinitely. In such an embodiment, as the sharing user's location changes so does the destination of the following user. According to an example embodiment, the destination of the following user can change as the sharing user's location changes or, alternatively, the following user's destination can be modified to include the past and present locations of the sharing user. This for example, allows a user to follow the path of another user through a tour of a city. This is particularly useful for groups touring around a city new to them, or for users who wish to cycle together, but at different speeds.

Figure 2:
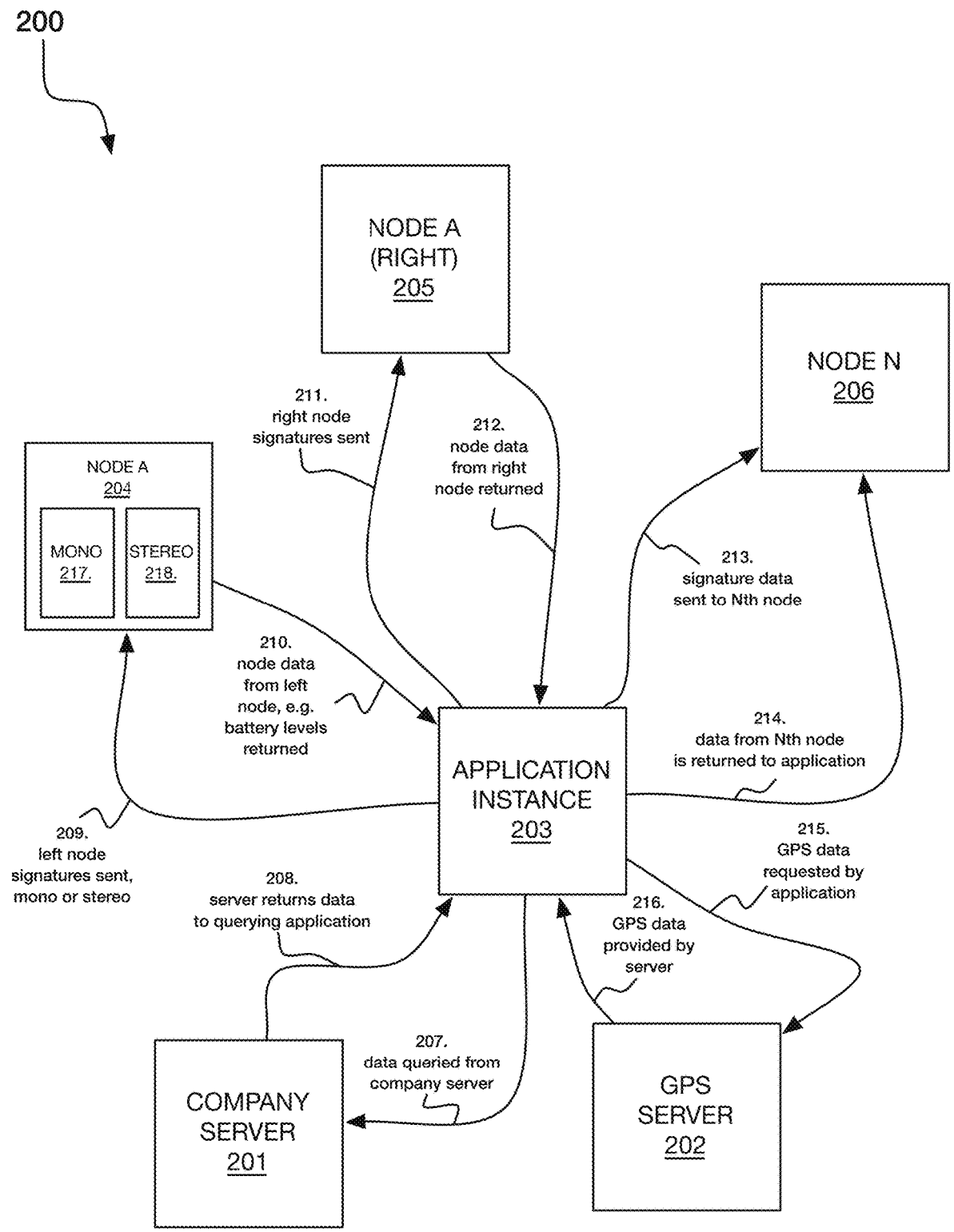
FIG. 2 is a data flow diagram of a method that provides navigation commands according to principles of the present invention.

FIG. 2 depicts a system 200 which facilitates direct sharing of location information. In the system 200, the vibratory nodes 204, 205, and 206 are connected via the single application instance 203. In the system 200 the user associated with the nodes (204, 205) shares her destination with one or more other users directly by connecting to their node 206 via a direct connection, i.e., single application instance 203. As in the system 100 described hereinabove in relation to FIG. 1, the application instance 203 is similarly connected to the company server 201 and GPS server 202. Likewise, the application 203 can query data 207, e.g., possible destinations, and receive results 208 to the query. Similarly, the application 203 sends GPS data requests 215 and receives GPS data results 216.

In the system 200, a user associated with the vibratory nodes (204, 205) makes an indication via the application 203 to send following commands to the other user who is associated with the vibratory node 206. In this example, the nodes 204, 205, and 206 are connected to the application 203 and thus, the appropriate haptic signatures 209, 211, and 213 and node data 210, 212, and 214 are communicated via the application 203. This allows the nodes 204, 205, 206 to provide navigation commands (such as stereo commands 218 or mono commands 217 described herein below) to facilitate following.

FIG. 3 is an exploded schematic of a vibratory node 300 that may be used to provide navigation commands as described herein (for example at nodes 104, 105, 107, 108, 204, 205 and 206 of FIGS. 1 and 2). The node 300 includes an outer housing 305 and an inner housing cover 308, the inner housing cover being a material in contact with a user. Within the housings 305 and 308 are a battery 302, haptic motor 301, microcontroller 306, and Bluetooth module 307. The Bluetooth module 307 is configured to communicate with an application 102, 106, 203 so as to receive haptic signatures 114, 115, 117, 119, 209, 211, 213 from the application. Upon receipt of the haptic signatures, the Bluetooth module 307 provides the signatures to the microcontroller 306 to process the signatures. The microcontroller 306 operates to provide any manner of processing functionality needed by the node 300. The micro-controller 306 can run software instructions to execute the signatures, i.e., power the haptic motor 301 to vibrate in a certain pattern so as to perform the haptic signature. This processing may include sending a command to the motor 301 to vibrate so as to perform a signature (to generate and deliver a corresponding pattern of vibrations). Further, the micro-controller 306 may execute instructions to pass information, such as battery-levels, back to the application 102, 106, 203. The battery 302 powers the node 300 and the various components of the node. The node 300 includes a connecter 304 and magnet 303 that may be used to connect to other devices or structures for charging, communication, or placement and positioning of the node 300.

Figure 4:
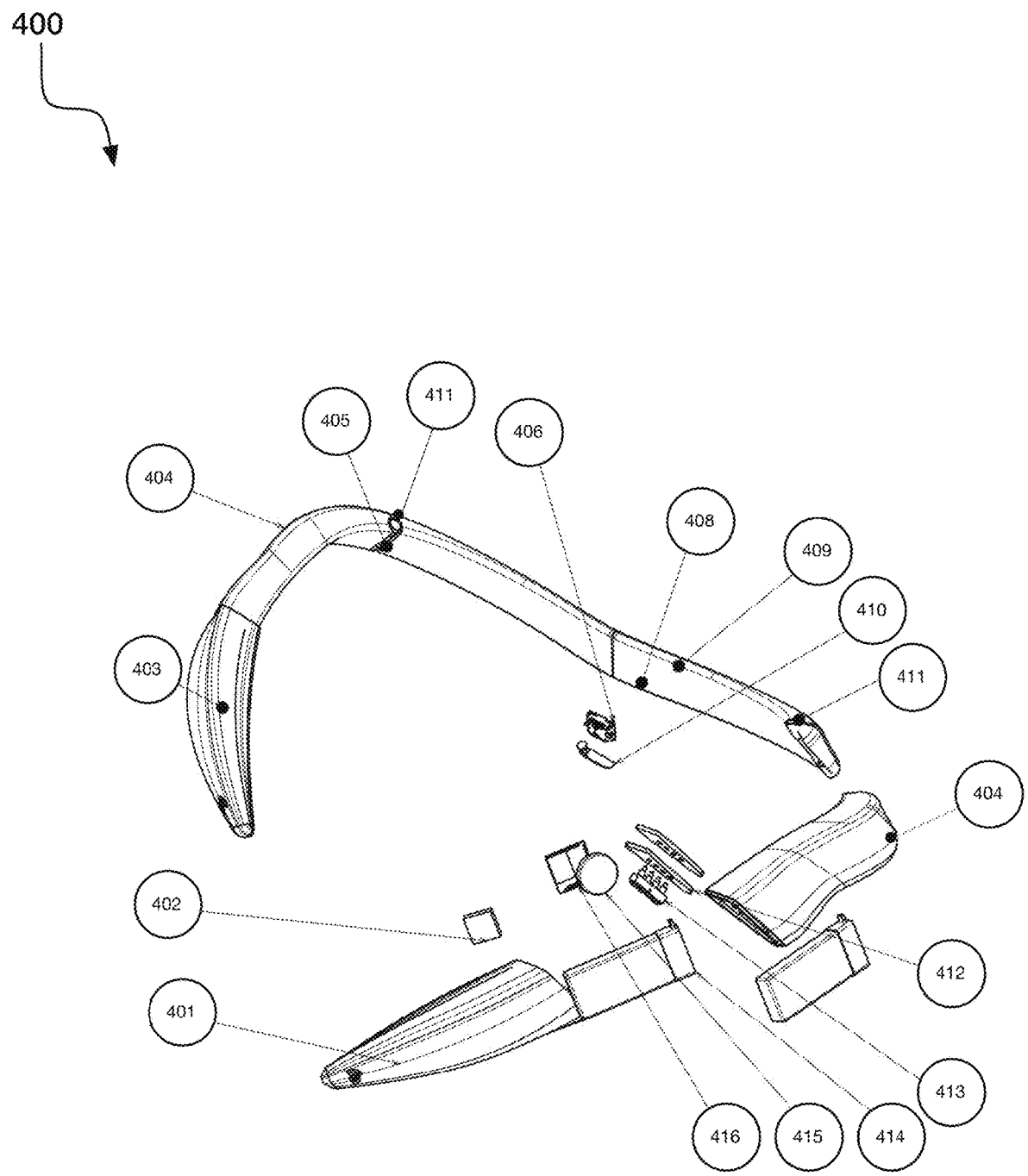
FIG. 4 is an exploded view of a vibratory node and housing sleeve that may be employed in an embodiment to facilitate providing navigation commands.

FIG. 4 depicts a device 400 that includes a sleeve 405 that is worn by a user according to an embodiment. Affixed to the sleeve 405 are the vibratory nodes 401 and 403 which may operate according to any method described herein. The housing of the sleeve 405 contains two hinges 411 with a soft cover 408 on the inside surface of the housing. Further, the sleeve 405 includes a micro-USB connector 406 which is protected by a splash proof cover 410. The sleeve 405 consists of a back component 409 and two arm components 404 on the left and right side. The nodes 401 and 403 are connected by magnets 412 to the arm components 404. The charging connector 413 allows the battery 414 held in the nodes to be charged through the sleeve. This powers the haptic motor 415, micro controller 416 and Bluetooth module 402.

Embodiments of the present invention rely on haptic signatures 114, 115, 117, 119, 209, 211, 213 to provide navigation commands. Haptic signatures, according to an embodiment, are packets of information that instruct the vibratory nodes 104, 105, 107, 108, 204, 205, 206, 300, 401, 403 on how (in which patterns) to vibrate. According to an embodiment, the logic for creating and dispatching haptic signatures is handled by the software of an application 102, 106, 203 which implements an embodiment of the invention and the vibratory nodes largely behave as passive receivers of information. For instance, in an embodiment, any delays between haptic signatures are handled by the application itself. However, the vibratory nodes may contain microcontrollers which run software to execute the haptic signatures and pass information, such as battery-levels, back to the application for processing. In an alternative embodiment, the microcontrollers may comprise additional software to perform the various embodiments described herein. For instance, such an embodiment may operate without utilizing an application and may rely upon communication between the vibratory nodes and a remotely located computing device, e.g., a GPS server, to provide navigation commands as described herein. Further, in another alternative embodiment, all of the necessary haptic commands may be provided, e.g., from an application, upon beginning navigation and in such an embodiment, the microcontroller 306, 416 may determine timing of executing the signatures.

Embodiments of the present invention may utilize unique haptic signatures that result from testing and research. Haptic signatures are a key part of the overall user-experience as they form the majority of the interaction between the user and embodiments of the present invention. Thus, the signatures utilized by embodiments represent the intention of the navigation command at a very basic level. To achieve this, signatures employed in embodiments fulfill several requirements, namely attention, suggestion, distinction, and consistency.

A signature should get the attention of a user seeking navigation. Thus, a signature preferably elicits a sufficiently strong vibration for it to be noticeable by the user, whilst at the same time not overpowering and distracting the user from her wider environment, or worse, agitating the user. In embodiments, the strength of the signatures can be such that after continued use, the user's conscious interaction with the nodes diminishes, and is replaced by unconscious learned behavior. To draw a parallel with a real-world example, when a learning driver first takes to the road, she needs to be consciously attentive of her surroundings and vehicle. After repeated drives, the driver begins to relegate more responsibilities into subconscious awareness, until driving feels like second nature. It is a goal of embodiments of the present invention to achieve a similar level of subconscious awareness, and liberate the user to focus her attention on her environment, rather than the means to navigate the environment.

In addition to getting the user's attention, embodiments may also leverage haptic signatures that suggest the navigation command itself. Thus, in an embodiment, haptic signatures mirror the anthropocentric expectations of the user. For instance, according to one such example embodiment, the haptic signature of a left turn command comprises two shorter, discrete taps on the leftmost vibratory node, mimicking the way people interact with one another, such as tapping on someone's shoulder to get their attention, and turning to look in that direction. Likewise, in another embodiment, the haptic signature which indicates that a destination has been reached, consists of three longer taps, across both vibratory nodes, which is similar to the way someone might be congratulated by being patted on the back by several individuals after achieving a success. In another similar embodiment, the signature informing the user that she should turn around is, in contrast, composed of a single longer vibration across both nodes as though the user is being held back by someone. Suggestion is important, as it facilitates acceptance of the command by the user at a subconscious level.

Distinction is yet another important characteristic of haptic signatures that may be employed in embodiments. When navigating environments that require many quick successive signatures to be sent (such as in the narrow alleyways of an old town) or when travelling at higher speeds, it is important that the user receive clear discrete instructions on where to turn. According to an embodiment, improved signature distinctiveness is achieved through timing of executing signatures. In such an embodiment, delay between signatures forms a key part in creating this distinction. In an embodiment, timing of signatures, i.e., start time of when a signature is performed, takes into consideration the execution time of the next signature to be sent, the distance to the upcoming turn, and the speed at which the user is travelling. Another factor is the cessation of any existing signatures being played on the node. If the application sends a signature to a node before it has completed its existing signature, the new signature takes precedence. Similarly, in an embodiment, a signature's execution may be stopped by sending a very short, zero intensity signature to the node to cancel the existing signature from executing to completion. Delay and cessation work together to send distinct instructions to the user so as to avoid confusion.

Signature consistency is yet another important characteristic of haptic signatures employed in embodiments. Overall user-experience of embodiments of the present invention is determined by several factors, of which the design of the signatures is one. The user-interface and functionality of the application 102, 106, 203 and the server, e.g., 101 and 201, that the application interacts with, are other factors. To achieve consistency, according to an embodiment, the design of the signatures reflects the design of the overall user-experience. For example, if a user-interface of the application has a minimalist contemporary design, with a subtle, balanced color-scheme, the signatures may likewise reflect that minimalist and subtle design, for instance by tapering intensity and frequency.

Consistency can also refer to the consistent use of haptic signatures, i.e., utilizing the same signatures identically across the user-experience. As the battery 302, 414 of a vibratory node becomes depleted, the intensity with which the node can vibrate declines. In an embodiment, the node periodically, or on demand, updates the application 102, 106, 203 on the current status of the node's battery level. To maintain consistency in such an embodiment, when the battery level drops below a threshold, the application 102, 106, 203 issues a generic error signature to the node instructing the user to take action. If the user does not take action, the application calculates the increased level of signature intensity required to maintain a consistent vibration. Once this is no longer possible, rather than eliciting weaker and weaker vibrations, all directional signatures cease. Consistency is important, because it builds trust between the user and embodiments of the present invention, which in turn leads to a more enjoyable user-experience. Each haptic vibration will use a specific amount of energy to execute. By analysing the remaining battery left in a node and comparing it against the amount of energy required to execute any remaining commands, a rough estimate can be made as to when to stop using the nodes.

Embodiments of the present invention may also operate in what is referred to herein as mono or stereo mode. Where only one node is detected upon application launch, or where connection is lost to a second or higher node, for instance due to battery depletion, the mono mode is activated, otherwise stereo mode is the default. In addition, the user has the ability to select mono mode from within the application, overriding the automatic selection. The ability to select between mono and stereo mode within the application allows the user to share one pair of nodes with two users. A user can utilize as many vibratory nodes as she so desires, and the distribution of those nodes on the left or right side of her body is her decision to make. The default setup of the system is for the user to have two nodes connected to the application 102, 106, 203 at any given time. Herein, this is referred to as a "stereo" set-up as there are two nodes available, typically one for the left side of the user's body and one for the right side of the user's body. The user can see within the application which node corresponds to which side of the body and can set their sides as she so desires.

However, under some circumstances, for instance when sharing a pair of nodes between two users, or when the battery is depleted for one node, an embodiment may operate in a "mono" set-up, i.e., use of a single vibratory node for navigation. As only one node can occupy one side of the user's body at one time in the mono set-up, the position of the node on the body is itself not a clear indication of direction, as may be the case with two nodes in the "stereo" mode. Therefore, in such an embodiment, the haptic signatures are adapted so as to continue to give clear directional instructions to the user, for instance by using a single 'tap' for a left command, and a 'double tap' for a right command. The mono mode operates as a back-up mode; where possible stereo mode should be used as it is more intuitive to the user.

For any number of vibratory nodes, both the mono and stereo haptic signatures can be used because signatures are not limited by the number of nodes being used. It is possible, for instance, that a user with two nodes opts to use the mono signature set-up on both nodes. Nonetheless, embodiments of the present invention continue to operate even when only one, or any odd number of nodes is available at any given time. This split between mono and stereo signatures allows the system to remain adaptable, while at the same time maximizing user experience where possible.

To illustrate, consider a hypothetical example embodiment where a group of six cyclists wish to take a tour together. The number of vibratory nodes N used amongst the group can vary between zero and n. In this example, N is equal to seven, as in there are seven nodes available to be distributed amongst the cyclists. In this example, one cyclist receives two nodes both of which are set to stereo mode. For this cyclist (Cyclist A), one node will be held on the left side of the body and another node on the right. Since there are an insufficient number of nodes for the remaining cyclists to each have two nodes in stereo mode, the remaining five cyclists each use (hold or wear) one node. These remaining five nodes will operate in mono mode and continue to give directional queues. Table 1 below shows the potential distribution of nodes amongst the cyclists when using varying numbers of nodes and the resulting modes of operation that the nodes may use in each distribution.

TABLE 1.0

Use of embodiments of the present mention under various scenarios.

|  | Cyclist A | Cyclist B | Cyclist C | Cyclist D | Cyclist E | Cyclist F |
| --- | --- | --- | --- | --- | --- | --- |
| 7 Nodes | 2 × Stereo | 1 × Mono | 1 × Mono | 1 × Mono | 1 × Mono | 1 × Mono |
| 6 Nodes | 1 × Mono | 1 × Mono | 1 × Mono | 1 × Mono | 1 × Mono | 1 × Mono |
| 11 Nodes | 2 × Stereo | 2 × Stereo | 2 × Stereo | 2 × Stereo | 2 × Stereo | 1 × Mono |

Figure 5:
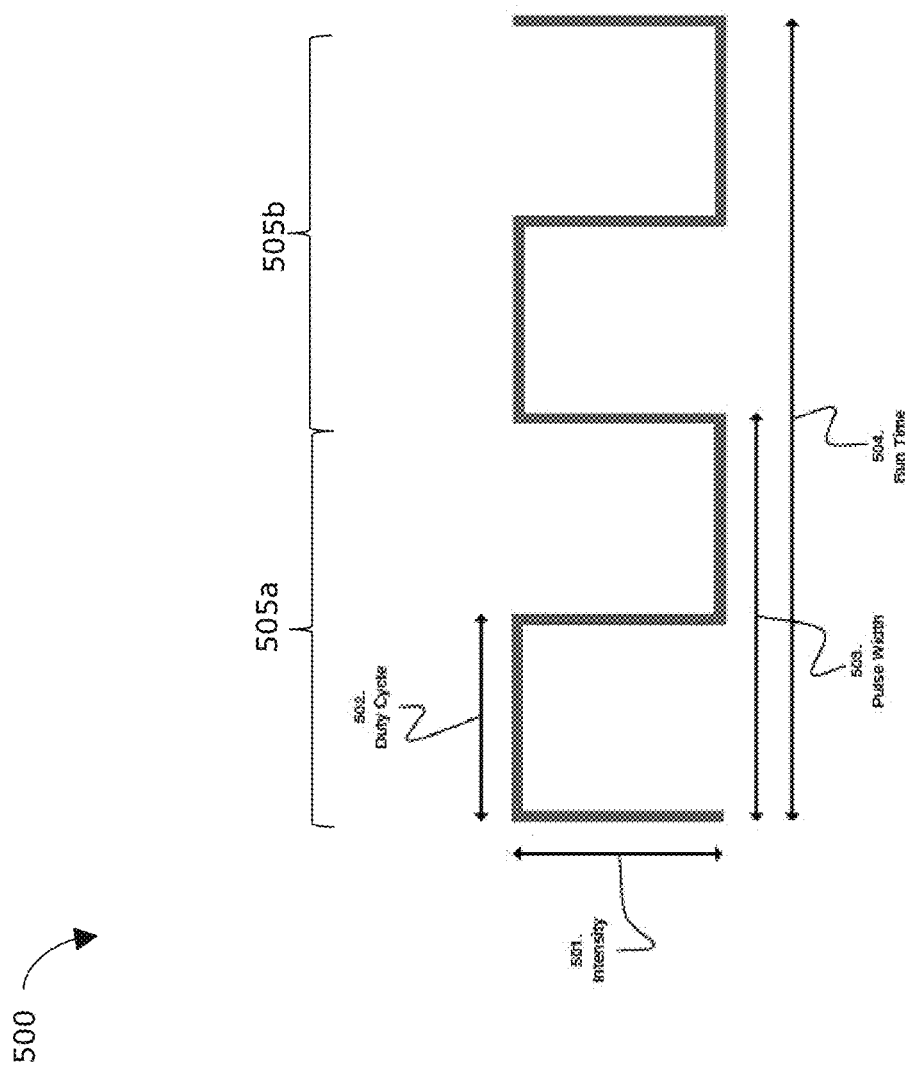
FIG. 5 is a representation of a haptic signature that may be used to provide a navigation command.

FIG. 5 depicts an example haptic signature 500 that may be used in an embodiment of the invention. As described herein, when a command is sent to a vibratory node, the node vibrates along a unique pattern or signature for that command. The signatures used in embodiments, such as the signature 500, are composed of one or more pulses 505*a* and 505*b* and have a variety of attributes including intensity 501, duty cycle 502, pulse width 503, and total run time 504.

Intensity 501 determines the amplitude of the waveform 500. In an embodiment, intensity 501 is measured as a percentage from zero to one hundred, where one hundred is maximum vibration intensity (heaviest or strongest to the sense of touch). Intensity 501 is the strength at which the haptic motor (301, 415) in the node vibrates. Pulse width 503 is the total length of one waveform 505*a*. Pulse width 503 can be measured in units of time, e.g., milliseconds, from zero upwards. Duty cycle 502 is a measurement of the period of time in which the pulse 505*a* is active (in the crest state). In an embodiment, duty cycle 502 is measured as a percentage from zero to one hundred. A value of fifty would mean that the crest and trough of the waveform have an equal length of time. Total run time 504 is the total period of time of the pulse 500. Like pulse width 503, run time 504 can be measured in units of time from zero upwards. Further, it is noted, that in an embodiment, the run time 504 need not match up with the completion of a waveform (whole numbers versus fractions of pulses).

Figure 6:
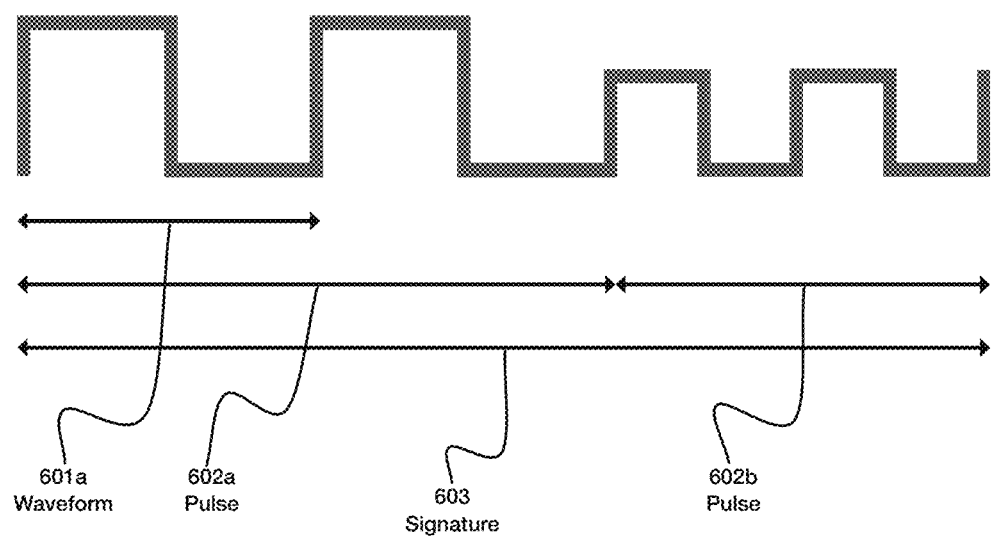
FIG. 6 is a representation of a haptic signature that corresponds to a navigation command that may be delivered to a user via a vibratory node according to an embodiment.

FIG. 6 depicts another haptic signature 603 composed of a variety of waveforms, e.g., the waveform 601*a* and the pulses 602*a* and 602*b* that are used to form the haptic signature 603. The waveform 601*a* consists of one peak and one trough, whereas the pulses 602*a* and 602*b* consist of multiple waveforms. The pulse 602*a* is a 50/50 duty cycle waveform with a high intensity. The pulse 602*b* likewise has a 50/50 duty cycle waveform but, at a relatively lower intensity to that of pulse 602*a*.

Figure 7:
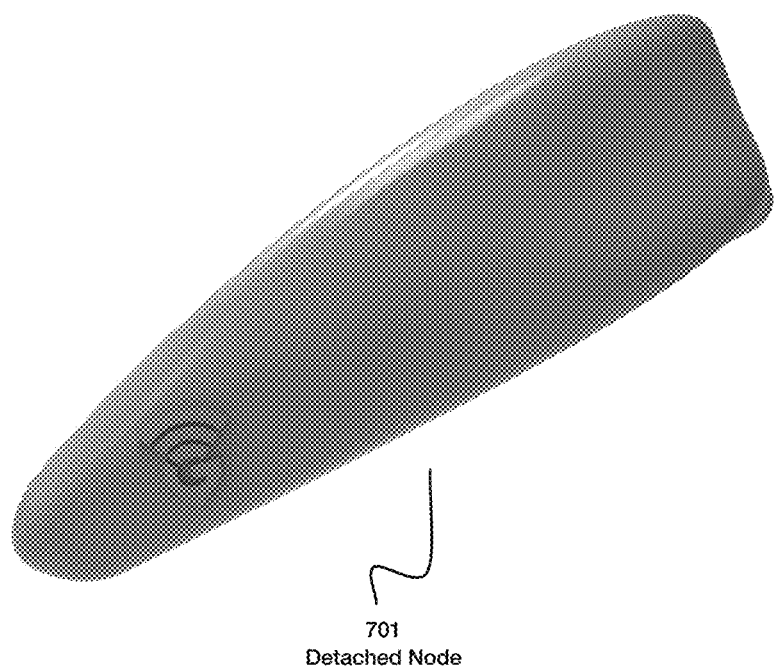
FIG. 7 illustrates a perspective view of a vibratory node utilized in an embodiment.

Embodiments of the present invention may utilize any vibratory nodes capable of performing haptic signatures as described herein. However, embodiments may also utilize nodes tailored to the performance of the embodiments described herein. FIG. 7 depicts one such example vibratory node 701 that is a standalone node. For instance, the node 701 is a lightweight, splash-proof node that appeals to a contemporary design aesthetic.

Figure 8:
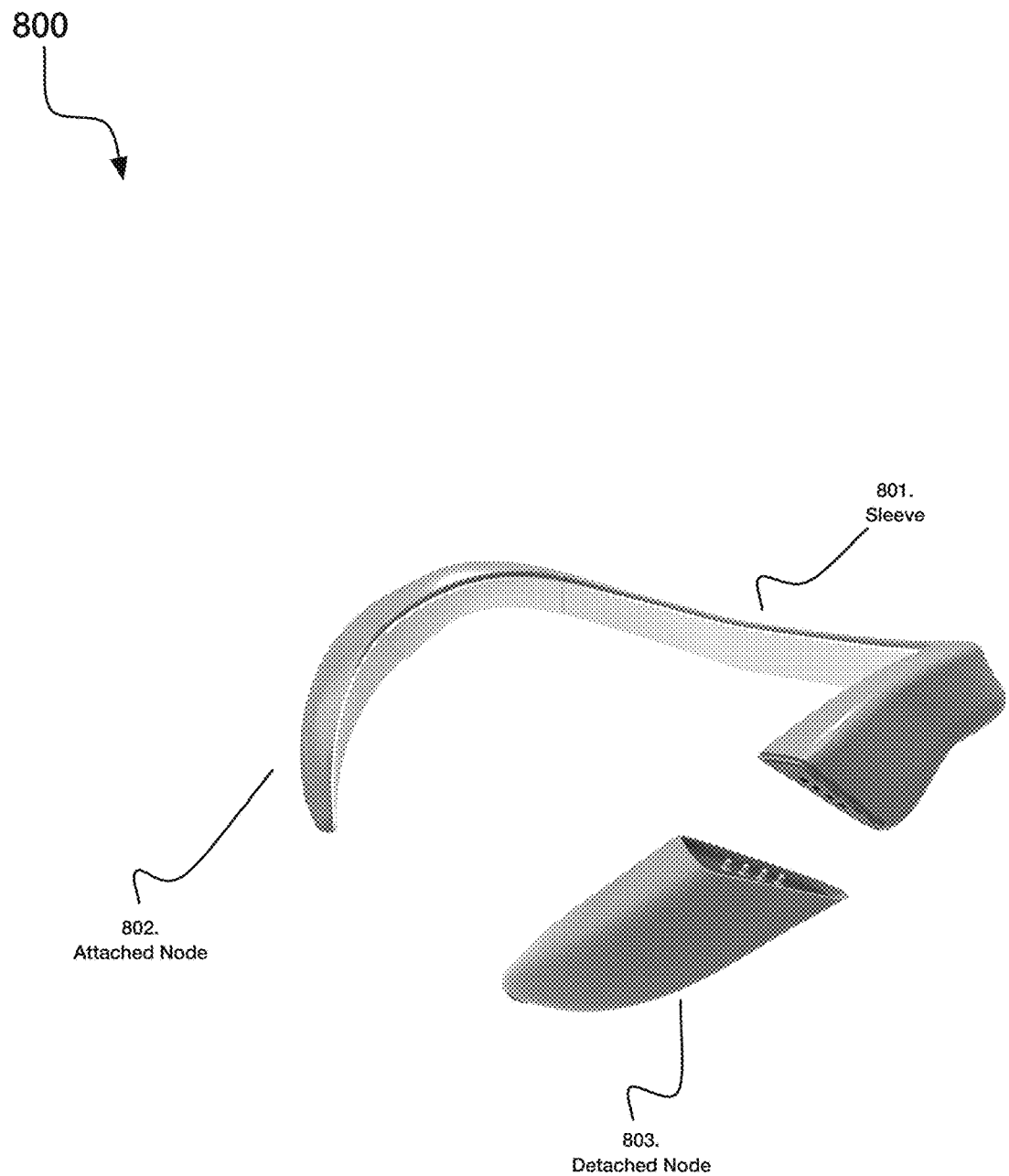
FIG. 8 is a schematic view of a vibratory node and sleeve that may be worn by a user according to an embodiment.
Figure 9:
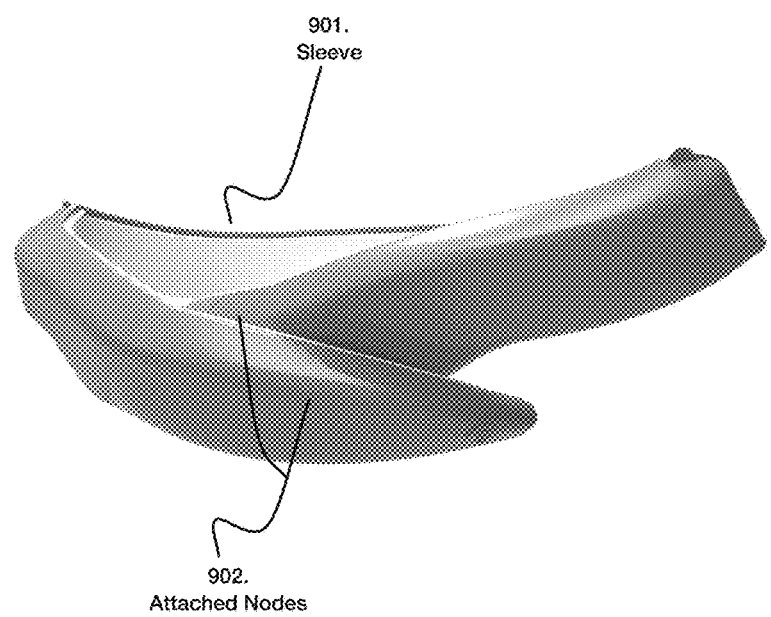
FIG. 9 depicts vibratory nodes and a sleeve in a folded position that may be utilized in an embodiment.

The vibratory nodes used by embodiments may function independently of any further accessory. For instance, as illustrated in FIG. 8, a node 803 can be detached and used alone worn in a pocket or glove of the user, for non-limiting example. The detached node 803 can for instance be placed in the trouser pocket of a user, held in one's hand, or inserted into a glove. However, to increase a user's experience, in an embodiment of the present invention, a sleeve 801 can be used to hold the nodes 802 and 803 around the user's neck so that the nodes rest just above the user's clavicle. This area of the body is sufficiently sensitive and allows for a large skin-to-node surface connection for the nodes (802, 803) to operate. The sleeve 801 is designed to be sleek and stylish. The nodes (802, 803) are inserted into the arms of the sleeve (801) and held in place by a magnet, e.g., 303, so as to be easily removable for relocation on the user's person. The device 800 may employ various geometries, materials, and dimensions as understood by one skilled in the art given this disclosure. Similarly, FIG. 9 illustrates another node-sleeve system 900 that may be used in an embodiment. The node-sleeve system 900 comprises the nodes 902 and sleeve 901 where the sleeve 901 is foldable for storage and convenient charging.

The sleeves 801, 901 used in embodiments of the invention (800, 900) provide both stability and balance. The top half of a user's torso is generally speaking, quite a stable part of the body, especially in the upright position, and the neck area tends to maintain horizontal balance, relative to other parts of the body. A watch for instance, held on the wrist, must be fastened to stop it from slipping off. Conversely, sunglasses or headphones held above the torso on the head do not require fastening. Similarly, the trapezius muscle forms a natural slant from the back of the neck to the front of the chest, and this gradient adds greater stability to the sleeve-node systems e.g., 800 and 900, that may be employed in embodiments. The sleeves (801, 901) are designed such that when worn around a user's neck the vibratory nodes are in contact with skin above the user's clavicle. The position also tends to be relatively stable across multiple activity types. If the user is jogging or cycling for instance, the torso may move down and forward, but the position still remains relatively stable.

Further, in an embodiment, the sleeve is malleable to increase comfort and contains two spring loaded hinges, such as the hinges 411 of FIG. 4, that allow the sleeve to adapt for a comfortable fit for a range of neck circumferences.

Figure 10:
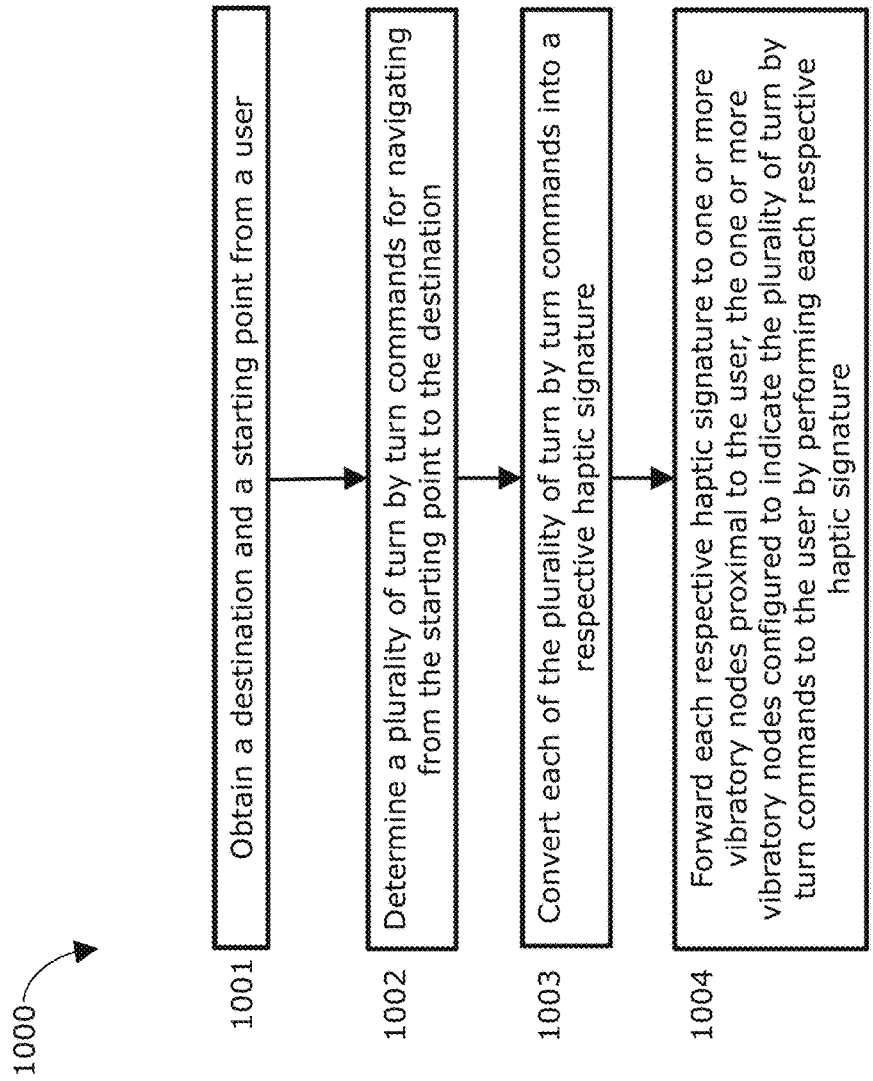
FIG. 10 is a flowchart of a method of providing navigation commands according to an example embodiment.

FIG. 10 depicts a flowchart of a method 1000 for providing navigation commands according to an example embodiment. At step 1001 the method 1000 begins by obtaining a destination and a starting point from a user. In an example embodiment of the method 1000 the destination and starting point may be obtained via any means known in the art. Further, according to an embodiment, the destination and starting point is provided through indications provided by the user, e.g. starting and destination coordinates. According to an embodiment, the destination and starting point obtained at step 1001 may comprise: a latitude coordinate, a longitude coordinate, a title, a type, and a unique identifier. In another embodiment, the destination is selected from a database through a user's navigation in a computer device implemented application and this selected destination is obtained. In such an embodiment, the destinations in the database that are available for selection may be added to the database by users of a social network. Further still, in yet another embodiment, the starting point of the user is obtained by receiving GPS data from a computing device associated with the user, e.g., a mobile telephone. Moreover, in yet another embodiment, the destination information is obtained from another user, for example, in an instance where one user is following another user. Further, according to an alternative embodiment, at least the destination and/or starting point are obtained based upon the user scanning a QR code. It is noted that the obtained destination is not limited to being a single destination and in one such embodiment of the method 1000, the obtained destination is a tour comprising a plurality of destinations. In such an embodiment, the tour may be created by the user indicating two or more destinations which are each obtained at step 1001. Moreover, according to an embodiment, the destination and starting point obtained at step 1001 need not be static. For instance, in one such embodiment the destination dynamically changes based upon a location of another user.

To continue, at step 1002 the method 1000 determines a plurality of turn by turn commands for navigating from the starting point to the destination which were obtained at step 1001. According to an embodiment, the turn by turn commands for navigating may be determined using a commercially available platform and inputting the starting point and destination into said platform. Turn by turn commands are determined by first calculating a route between the user's starting point and the destination, then by analyzing each of the individual steps required to complete the route. Specifically, in an embodiment, the degree of angle between turn by turn commands is analyzed. For instance, where the next step lies at an angle of zero degrees away from the last coordinate of the previous step, it is immediately ahead and a forward command is registered, where the next step lies at for instance 90 degrees or 270 degrees, a right and left command is respectively determined.

Next, at step 1003, the method 1000 converts each of the plurality of turn by turn commands into a respective haptic signature. According to an embodiment, each turn by turn command has a respective haptic signature which is predetermined, such that each turn by turn command can be converted to a haptic signature for instance, through use of a look up table. In an embodiment where the turn by turn commands determined at step 1002 are analyzed to determine the angle between consecutive commands, this angle analysis may be used to convert each command into a haptic signature at step 1003. According to an embodiment, the haptic signatures are signals provided to a vibratory motor to execute a vibratory pattern, i.e., haptic signature. In an embodiment, each haptic signature comprises one or more pulses with a unique combination of pulse amplitude, pulse width, duty cycle, and total run time. Where a command is to be sent to the node(s), the application pulls the the corresponding haptic signature from a collection of signatures, which is then used to tell the node(s) how to vibrate. An alternative embodiment of the method 1000 considers the quantity of vibratory nodes associated with the user when performing the conversion at step 1003. In such an embodiment, data is obtained regarding the number of vibratory nodes associated with the user and converting each of the plurality of turn by turn commands into respective haptic signatures considers if the number of vibratory nodes associated with the user is odd or even. In such an embodiment, when the number of nodes is even, the turn by turn commands are converted into stereo mode haptic commands and when the number of nodes is odd, the turn by turn commands are converted into mono-mode commands. For example, a left command in stereo mode stimulates a short and then long vibration on the left node, while in mono mode, a single short vibration is sent.

At step 1004 the method 1000 forwards each respective haptic signature to one or more vibratory nodes proximal to the user where the one or more vibratory nodes are configured to indicate, one at a time and spaced across time, the plurality of turn by turn commands to the user by performing each respective haptic signature. According to an embodiment, the vibrations of the vibratory nodes are generated by a vibratory motor and the haptic signatures are signals provided to such a vibratory motor to operate in accordance with the haptic signature. For example, the haptic signature may operate the motor with a certain amplitude for a certain period of time to indicate a left turn. In an example embodiment, at step 1004, timing for forwarding each respective haptic signature is determined. In such an embodiment, the determined timing causes a given respective haptic signature to be forwarded to the vibratory nodes when it is appropriate for the user to perform the associated (or corresponding) turn by turn command. This timing may be determined based upon a combination of factors such as: execution time of performing a haptic signature (generating and delivering the corresponding pattern of vibrations to the user), distance to upcoming turn, and a current speed at which the user is traveling.

An alternative embodiment of the method 1000 further considers power available at the vibratory nodes when performing the forwarding at step 1004. In such an embodiment, battery level information from the vibratory nodes is received and the forwarding at step 1004 is ceased when the battery level information is below a threshold. According to an embodiment, these thresholds are automatically identified from past navigating. For instance, in a past navigation a turn may be missed and the battery level data at the time the turn was missed may be obtained and used to determine the thresholds for ceasing forwarding of the haptic commands.

Yet another embodiment of the method 1000 facilitates users following one another. In such an embodiment, a request by a user to follow another user is received and upon approval by the user to be followed, turn by turn commands to facilitate following are determined and these commands are converted to haptic signatures and timely forwarded to the following user.

Figure 11:
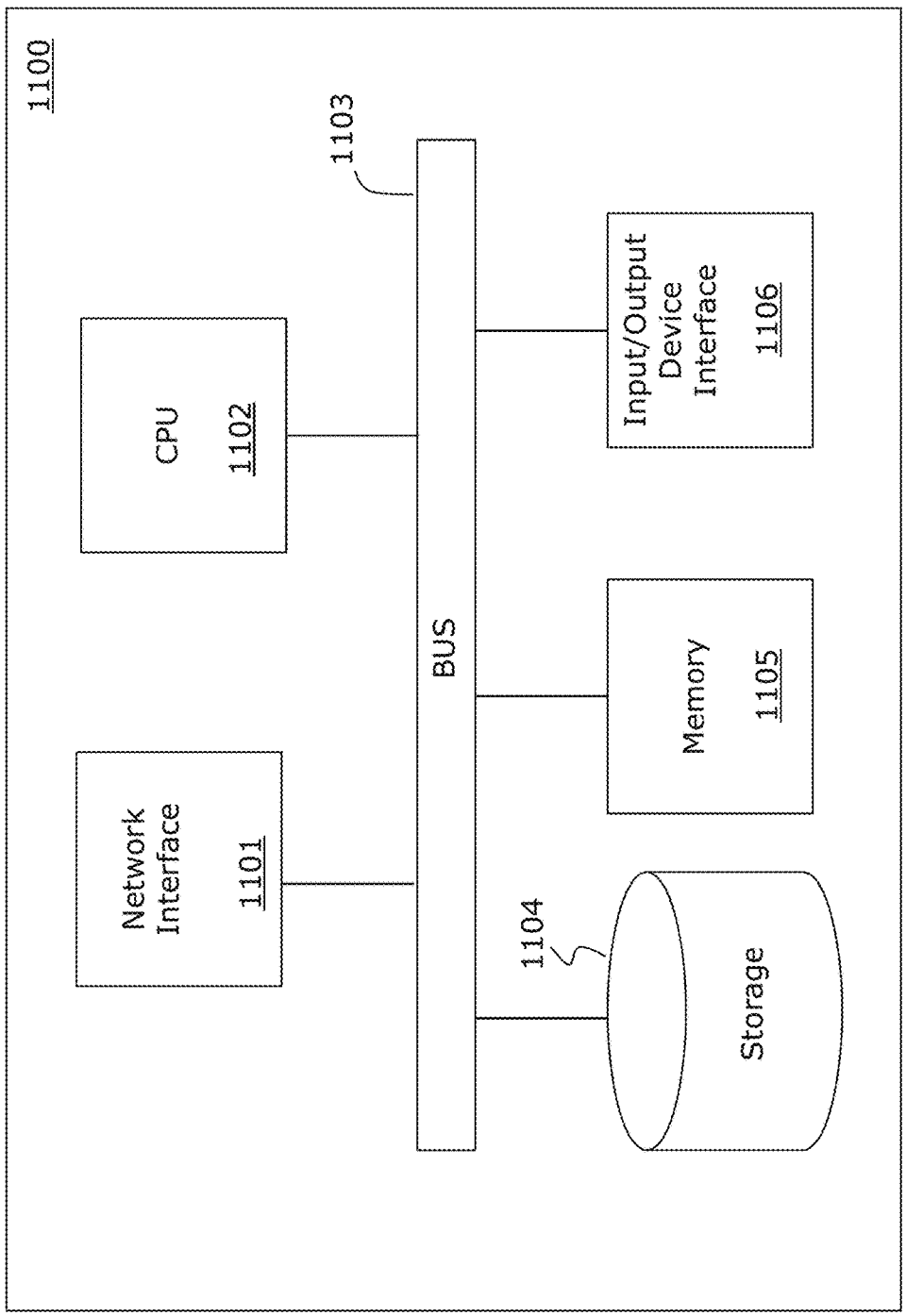
FIG. 11 is a block diagram of a computer-based system that may be employed in embodiments to provide navigation commands.

FIG. 11 is a simplified block diagram of a computer-based system 1100 that may be used to provide navigation commands according to an embodiment of the present invention. The system 1100 comprises a bus 1103. The bus 1103 serves as an interconnect between the various components of the system 1100. Connected to the bus 1103 is an input/output device interface 1106 for connecting various input and output devices such as a keyboard, mouse, display, speakers, vibratory nodes etc. to the system 1100. A central processing unit (CPU) 1102 is connected to the bus 1103 and provides for the execution of computer instructions. Memory 1105 provides volatile storage for data used for carrying out computer instructions. Storage 1104 provides non-volatile storage for software instructions, such as an operating system (not shown). The system 1100 also comprises a network interface 1101 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 1100, or a computer network environment such as the computer environment 1200, described herein below in relation to FIG. 12. The computer system 1100 may be transformed into the machines that execute the methods (e.g. 1000) described herein, for example, by loading software instructions into either memory 1105 or non-volatile storage 1104 for execution by the CPU 1102. One of ordinary skill in the art should further understand that the system 1100 and its various components may be configured to carry out any embodiments of the present invention described herein. Further, the system 1100 may implement the various embodiments described herein utilizing any combination of hardware, software, and firmware modules operatively coupled, internally, or externally, to the system 1100.

Figure 12:
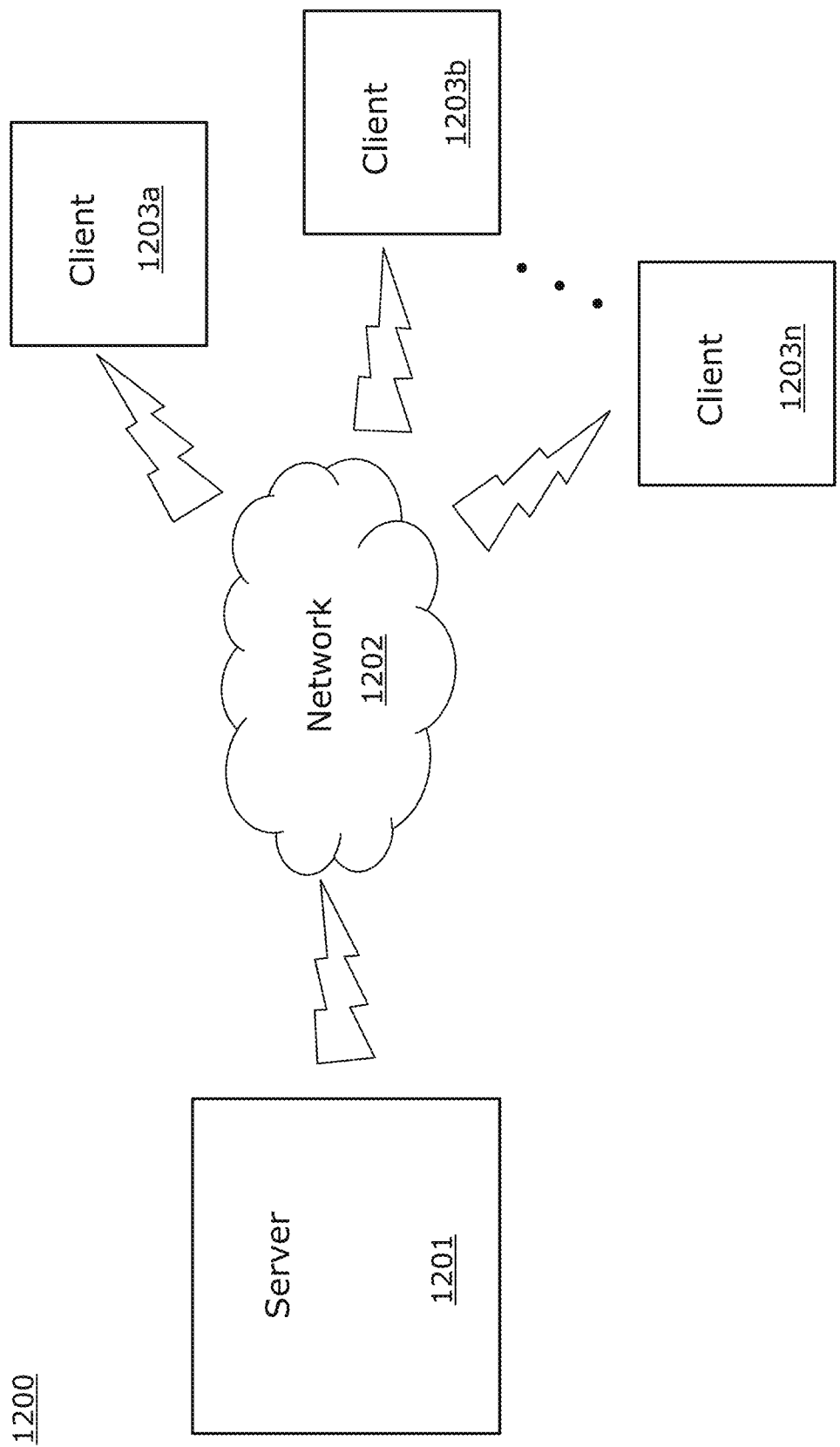
FIG. 12 is a diagram of a computer network environment in which an embodiment of the present invention may be implemented.

FIG. 12 illustrates a computer network environment 1200 in which an embodiment of the present invention may be implemented. In the computer network environment 1200, the server 1201 is linked through the communications network 1202 to the clients 1203a-n. The environment 1200 may be used to allow the clients 1203a-n, alone or in combination with the server 1201, to execute any of the methods (e.g., 1000) described herein. For non-limiting example, computer network environment 1200 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of providing navigation commands to a user, the method implemented by:
   a first vibratory node including: (i) a first motor, (ii) a first microcontroller, (iii) a first Bluetooth® module, (iv) a first magnet, and (v) a first electrical connector;
   a second vibratory node including: (i) a second motor, (ii) a second microcontroller, (iii) a second Bluetooth® module, (iv) a second magnet, and (v) a second electrical connector;
   a neck-worn housing including: (i) a back component, (ii) a first arm, wherein a proximal end of the first arm is connected to one end of the back component, and a distal end of the first arm includes a third magnet and a third electrical connector, and (iii) a second arm, wherein a proximal end of the second arm is connected to an end opposite to the one end of the back component, and a distal end of the second arm includes a fourth magnet and a fourth electrical connector,
   wherein:
   the first vibratory node is detachably coupled magnetically with the first arm via the first and third magnets, and coupled electrically with the first arm via the first and third electrical connectors when detachably coupled magnetically to the first arm, and
   the second vibratory node is detachably coupled magnetically with the second arm via the second and fourth magnets, and coupled electrically with the second arm via the second and fourth electrical connectors when detachably coupled magnetically to the second arm; and
   a processor communicatively coupled to the first and second vibratory nodes via the first and second Bluetooth® modules respectively;
   the method comprising, at the processor:
   obtaining a destination and a starting point from a first user, wherein the destination is dynamically changing based upon a location of a second user;
   determining a plurality of turn by turn commands for navigating from the starting point to the destination;
   converting each of the plurality of turn by turn commands into a respective haptic signature;
   determining timing for forwarding each respective haptic signature based upon at least one of: (i) execution time of performing a haptic signature to be forwarded and (ii) a speed at which the first user is traveling;
   forwarding each respective haptic signature to at least one of the first and second Bluetooth® modules of the first and second vibratory nodes in accordance with the timing determined, wherein forwarding each respective haptic signature to at least one of the first and second Bluetooth® modules causes at least one of the first microcontroller and the second microcontroller to control at least one of the first motor and the second motor to indicate the plurality of turn by turn commands one at a time to the first user by performing each respective haptic signature; and repeating the determining a plurality of turn by turn commands and the converting each of the plurality of turn by turn commands into a respective haptic signature as the destination changes.

2. The method of claim 1, wherein the timing is further determined based upon distance to upcoming turn in a path of travel of the first user from the starting point to the destination.

3. The method of claim 1, wherein at least one of the destination and starting point are obtained in response to the first user scanning a quick response (QR) code.

4. The method of claim 1, wherein the destination is selected by the first user from a database of locations.

5. The method of claim 4, wherein one or more locations stored in the database are added by users of a social network.

6. The method of claim 1, further comprising:
receiving a request by a third user to follow the first user;
upon approval by the first user:
determining a plurality of following commands to facilitate the third user following the first user;
converting each of the plurality of following commands into a respective haptic signature; and
forwarding each respective haptic signature to at least one Bluetooth® module of one or more vibratory nodes associated with the third user, the one or more vibratory nodes associated with the third user configured to indicate the plurality of following commands to the third user.

7. The method of claim 1, further comprising:
obtaining data regarding a number of vibratory nodes associated with the first user; and
wherein converting each of the plurality of turn by turn commands into a respective haptic signature considers if the number of vibratory nodes associated with the first user is odd or even.

8. The method of claim 1, wherein the proximal end of the first arm is connected to the one end of the back component and the proximal end of the second arm is connected to the opposite end of the back component such that the first and second vibratory nodes are held in contact with the first user's skin, and wherein performing each respective haptic signature includes imparting vibrations to the first user's skin.

9. The method of claim 1, wherein each respective haptic signature comprises one or more pulses characterized by a set of parameters including pulse amplitude, pulse width, duty cycle, and total run time such that a value of at least one parameter of the set of parameters is unique for each respective haptic signature.

10. The method of claim 1, wherein the destination is a tour comprising a plurality of destinations.

11. The method of claim 10, further comprising:
enabling the first user to create the tour by indicating two or more destinations.

12. The method of claim 1, wherein the destination comprises at least one of: a latitude coordinate, a longitude coordinate, a title, a type, and a unique identifier.

13. The method of claim 1, further comprising:
receiving battery level information from at least one of the first and second vibratory nodes.

14. The method of claim 13, further comprising:
ceasing the forwarding when the battery level information is below a threshold.

15. The method of claim 1, wherein forwarding each respective haptic signature includes: forwarding respective haptic signatures to at least one of the first and second vibratory nodes when detached from the neck-worn housing and the at least one of the first and second vibratory nodes performs each respective haptic signature.

16. A system for providing navigation commands to a user, the system comprising:
a first vibratory node including: (i) a first motor, (ii) a first microcontroller, (iii) a first Bluetooth® module, (iv) a first magnet, and (v) a first electrical connector;
a second vibratory node including: (i) a second motor, (ii) a second microcontroller, (iii) a second Bluetooth® module, (iv) a second magnet, and (v) a second electrical connector;
a neck-worn housing including: (i) a back component, (ii) a first arm, wherein a proximal end of the first arm is connected to one end of the back component, and a distal end of the first arm includes a third magnet and a third electrical connector, and (iii) a second arm, wherein a proximal end of the second arm is connected to an end opposite to the one end of the back component, and a distal end of the second arm includes a fourth magnet and a fourth electrical connector,
wherein:
the first vibratory node is detachably coupled magnetically with the first arm via the first and third magnets, and coupled electrically with the first arm via the first and third electrical connectors when detachably coupled magnetically to the first arm, and
the second vibratory node is detachably coupled magnetically with the second arm via the second and fourth magnets, and coupled electrically with the second arm via the second and fourth electrical connectors when detachably coupled magnetically to the second arm; and
a processor and a memory with computer code instructions stored thereon and communicatively coupled to the first and second vibratory nodes via the first and second Bluetooth® modules respectively, the processor and the memory, with the computer code instructions, configured to cause the processor to:
obtain a destination and a starting point from a first user, wherein the destination is dynamically changing based upon a location of a second user;
determine a plurality of turn by turn commands for navigating from the starting point to the destination;
convert each of the plurality of turn by turn commands into a respective haptic signature;
determine timing for forwarding each respective haptic signature based upon at least one of: (i) execution time of performing a haptic signature to be forwarded and (ii) a speed at which the first user is traveling;
forward each respective haptic signature to at least one of the first and second Bluetooth® modules of the first and second vibratory nodes in accordance with the timing determined, wherein forwarding each respective haptic signature to at least one of the first and second Bluetooth® modules causes at least one of the first microcontroller and the second microcontroller to control at least one of the first motor and the second motor to indicate the plurality of turn by turn commands one at a time to the first user by performing each respective haptic signature; and
repeat the determining a plurality of turn by turn commands and the converting each of the plurality of turn by turn commands into a respective haptic signature as the destination changes.

17. The system of claim 16, wherein the processor and the memory, with the computer code instructions, are further configured to cause the processor to:
receive a request by a third user to follow the first user;
upon approval by the first user:
   determine a plurality of following commands to facilitate the third user following the first user;
   convert each of the plurality of following commands into a respective haptic signature; and
   forward each respective haptic signature to at least one Bluetooth® module of one or more vibratory nodes associated with the third user, the one or more vibratory nodes associated with the third user configured to indicate the plurality of following commands to the third user.

18. The system of claim 16, wherein the proximal end of the first arm is connected to the one end of the back component and the proximal end of the second arm is connected to the opposite end of the back component such that first and second vibratory nodes are held in contact with the first user's skin, and wherein performing each respective haptic signature includes imparting vibrations to the first user's skin.

19. The system of claim 16, wherein when the first and second vibratory nodes are detached from the neck-worn housing, at least one of the first and second vibratory nodes receives the forwarded respective haptic signatures and performs each respective haptic signature.

* * * * *